A. G. BOIVIN & F. J. DAVIGNON.
TIRE PROTECTOR AND AUXILIARY TREAD.
APPLICATION FILED OCT. 2, 1917.

1,260,506.

Patented Mar. 26, 1918.

INVENTOR
Arcade G. Boivin.
Fred J. Davignon.
BY
N. Winship Wheatley
ATTORNEY

A. G. BOIVIN & F. J. DAVIGNON.
TIRE PROTECTOR AND AUXILIARY TREAD.
APPLICATION FILED OCT. 2, 1917.
1,260,506.
Patented Mar. 26, 1918.
2 SHEETS—SHEET 2.
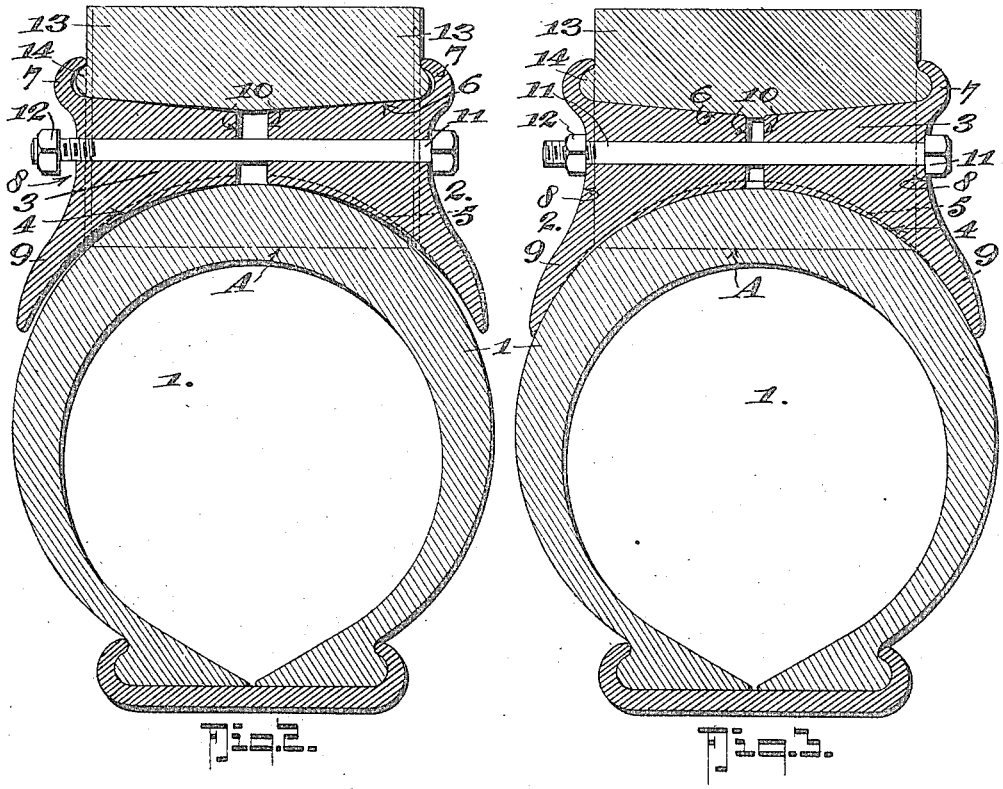
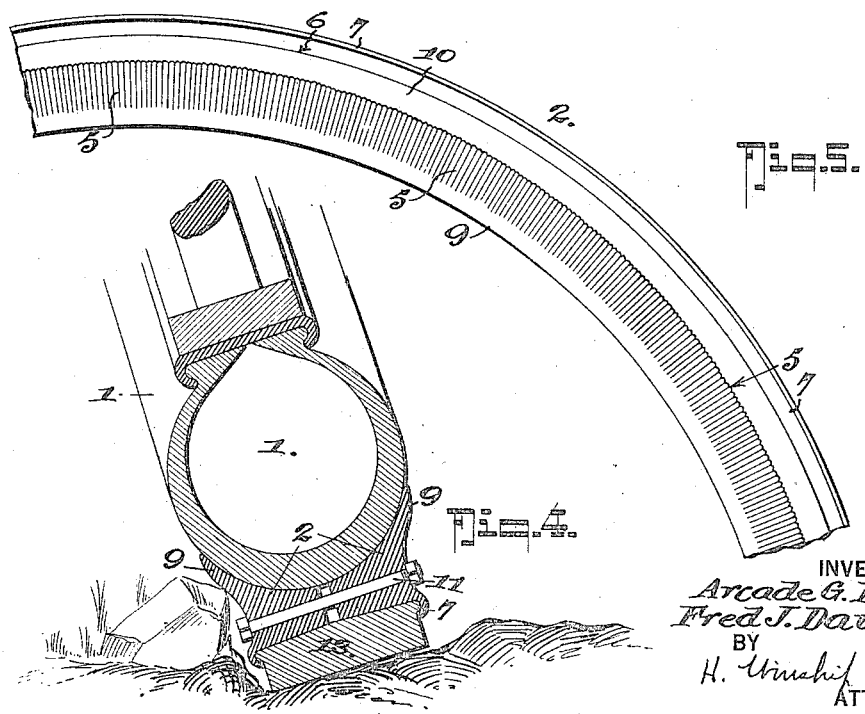
INVENTOR
Arcade G. Boivin
Fred J. Davignon.
BY
H. Winship Wheatley
ATTORNEY

UNITED STATES PATENT OFFICE.

ARCADE G. BOIVIN, OF COHOES, AND FREDERICK J. DAVIGNON, OF TROY, NEW YORK.

TIRE-PROTECTOR AND AUXILIARY TREAD.

1,260,506.        Specification of Letters Patent.        Patented Mar. 26, 1918.

Application filed October 2, 1917.   Serial No. 194,386.

*To all whom it may concern:*

Be it known that we, ARCADE G. BOIVIN, residing at Cohoes, in the county of Albany and State of New York, and FREDERICK J. DAVIGNON, residing at Troy, in the county of Rensselaer and State of New York, have invented certain new and useful Improvements in Tire-Protectors and Auxiliary Treads, of which the following is a specification.

Our invention has for its object to provide an improved device for encircling the tread face of a pneumatic tire and sustaining an auxiliary tread of solid rubber or rubber and fabric, the device including two like half ring-clamps and each half clamp is provided with an arcuate or concaved surface to fit over the tread face of the pneumatic tire and project to near the middle transverse line thereof to protect the pneumatic tire from stone bruises and cuts; each half clamp also includes a half tread-rim portion having a clencher flange at the outer side from which flange the tread face of the rim slants toward the center and inwardly, the two half ring-clamps having outside channels in which the heads of the securing bolts and nuts are located and protected, the bolts passing transversely through the half ring-clamps and function to draw the same together to effectually clamp them on the inflated tire and at the same time cause the flanges to tightly grip the beaded solid tire, which is held seated in the rim-channel formed by the opposed half clamp members.

Our invention also provides means for preventing slip between the inflated tire and the half clamp members by serrating the inner face of the half clamp members and providing a space between the opposed or meeting faces of the body portions of the half clamp members, whereby they may be drawn together with considerable lateral pressure to squeeze the solid tire and cause it to engage the rim surface with retaining friction.

The invention also includes those novel details of construction, combination and arrangement of parts, all of which will be first fully described, then be specifically pointed out in the appended claims and illustrated in the accompanying drawings, in which:

Fig. 3 is a view similar to Fig. 2 showing the parts in the final or secured position.

Fig. 4 is a view, on a small scale, similar to Fig. 3, showing how the inflated tire is protected against lateral stone bruises or cuts, by the protection afforded through the medium of the non-yieldable (rigid) half clamp members.

Fig. 5 is a detail elevation showing the inner side of a portion of one of the half clamp members and showing the serrations.

Fig. 6 is a perspective view and part section of a portion of one of the half clamp members showing the serrated face.

In the drawings, in which like letters and numerals of reference indicate like parts in all of the figures, 1 represents the pneumatic tire which is of the usual construction and, *per se*, constitutes no part of the present invention.

Figure 1:
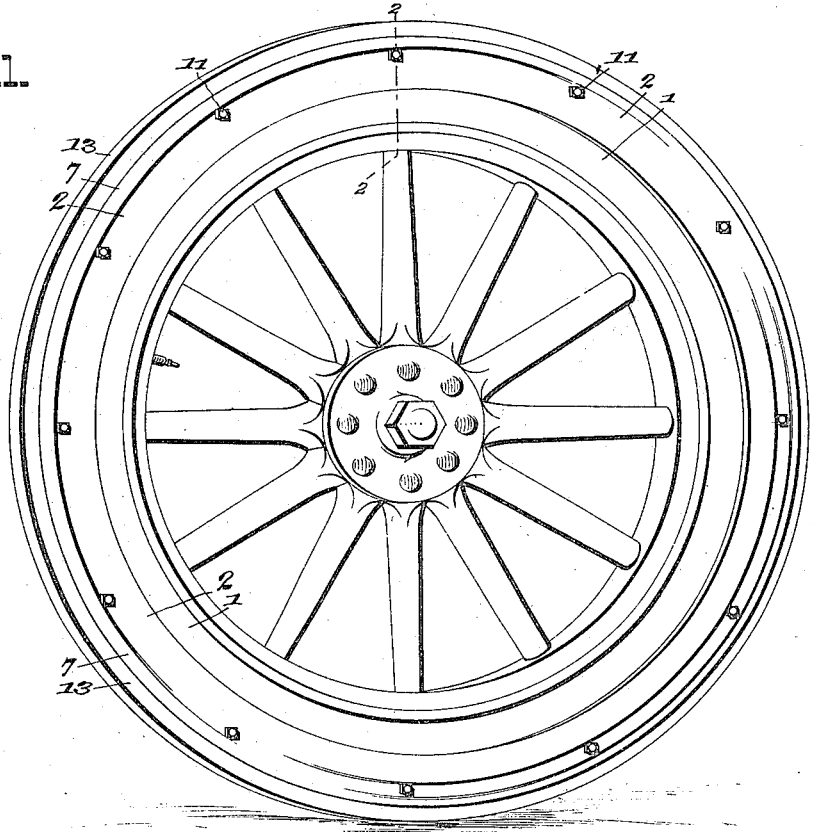
Figure 1 is a perspective view of a wheel with the invention applied.

The present invention comprises two half clamp members 2, each of identically the same cross sectional form, and each comprising a body portion 3 of as small a depth as possible, consistent with rigidity and sufficient space to provide the bolt holes through which the fastening bolts 11 are passed, the half clamp members also including the side flanges 9 which extend toward the horizontal middle line of the pneumatic tire some distance beyond the normal area of the normal tread surface of the tire when running under load with proper inflation (see dot and dash line A for the width of the normal tread or ground engaging surface). Each half clamp member also has a concaved face 4 extending from the central vertical face 10 of the body portion 3 to the extremity of the flange 9 and this surface 4 is preferably serrated as at 5 to insure adequate frictional engagement with the pneumatic tire to prevent creeping or slipping when the parts are in operation.

Figure 2:
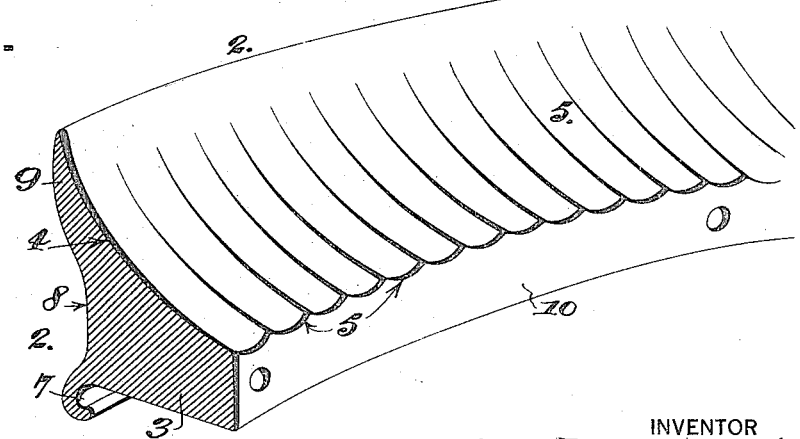
Fig. 2 is a cross section on the line 2—2 of Fig. 1, showing the position of the half clamp members, the auxiliary tread and the pneumatic tire just prior to applying the clamping pressure by tightening up on the bolts.

Each half clamp member also has a rim and annular rim tread face 6 and it has side clencher flanges 7, the tread face 6 slanting from the clencher flanges 7 inwardly toward the central plane of the tire, as best shown in Figs. 2 and 3 of the drawing.

In order to secure the half clamp members together, we provide bolts 11 with nuts 12 and where the bolt heads and the nuts 12 lie, the half clamp members are recessed annularly as at 8, to form a protecting groove for the bolt heads and nuts.

In practice, the auxiliary tread member 13 is made normally slightly wider than the normal tread face of the pneumatic tire so that when the parts are applied to the pneumatic tire and clamped up tightly, the auxiliary tread member 13 will be laterally compressed to present only a width substantially equal to the normal tread face of the tire, thus not presenting to the ground any greater degree of road friction than is ordinarily presented by the pneumatic tire and hence a drag on the engine power by abnormal road contact is avoided, and at the same time the compressing strains applied by the clamping action of the bolts 11 will force the tread member 13 to be tightly gripped by the flanges 7 and have the inner face of the member 13 forced into tight frictional engagement with the inwardly slanted faces 6 of the half clamp members, thus avoiding all danger of gripping or slipping of the auxiliary tread member 13 in the half clamp member rim channel.

It will be observed that the half clamp members are made of rigid metal of sufficient thickness and strength to withstand the impact of stone shocks which would ordinarily dent a sheet metal structure, such as has heretofore been suggested for tire armor, and thus prevent the stones from bruising the pneumatic tire or injuring it in any way.

With the use of our invention, the life of a pneumatic tire is indefinitely increased and should the auxiliary tread member 13 wear down to the rim, it can be easily replaced with a fresh auxiliary tread member, it being understood that the depth or thickness of the auxiliary tread member 13 is not great enough to interfere with the use of the invention on the diameters of wheels on which it can be used without danger of increasing the wheel diameter to a degree sufficient to cause the fenders or running board to be engaged thereby. It should be stated that the invention is especially adapted for use on automobiles of all types including pleasure vehicles and trucks.

From the foregoing description, taken in connection with the accompanying drawings, it is thought the complete construction, operation and advantages of our invention will be readily understood.

What we claim is:

1. In combination with an inflated tire; a pair of half clamp members each comprising a body portion and side flanges having concaved tire engaging faces which extend over the tread surface area of the tire and project over the sides of the tire to a place near the transverse middle line thereof, said half clamp members each also having an annular tread rim face and a side flange, said body portions having transverse bolt holes, a solid tire tread member held against said rim faces and engaged by said side flanges, clamp bolts passing through said bolt holes having provision for securing said half clamps together and applying retaining friction to clamp the same on the inflated tire and simultaneously compress the solid tire tread in the rim space formed by the opposing half clamp members.

2. In combination with an inflated tire; a pair of half clamp members each comprising a body portion and side flanges having concaved tire engaging faces which extend over the tread surface area of the tire and project over the sides of the tire in a place near the transverse middle line thereof, said half clamp members each also having an annular tread rim face and a side flange, said body portions having transverse bolt holes, a solid tire tread member held against said rim faces and engaged by said side flanges, clamp bolts passing through said bolt holes having provision for securing said half clamps together and applying retaining pressure to clamp the same on the inflated tire and simultaneously compress the solid tire tread in the rim space formed by the opposing half clamp member, the rim surfaces of the respective half clamp members sloping from the side flanges inwardly toward the center and the solid tread tire having its opposed face held in frictional engagement with said sloping surfaces by virtue of the compression strains applied through the clamping action of said half clamp members.

3. In combination with an inflated tire; a pair of rigid or non-yieldable half clamp members each comprising a body portion and side clencher flanges having concaved tire engaging faces which extend over the tread surface area of the tire and project over the sides of the tire to a place near the transverse middle line thereof, said half clamp members each also having an annular tread rim face and a side clencher flange, said body portions having transverse bolt holes, a solid tire tread member held against said rim faces and engaged by the side clencher flanges, clamp bolts passing through said bolt holes having provision for securing said half clamps together and applying retaining pressure to clamp the same on the inflated tire and simultaneously compress the solid tire tread in the rim space formed by the opposing half clamp member.

4. In combination with an inflated tire; a pair of rigid or non-yieldable half clamp members each comprising a body portion and side clencher flanges having concaved tire engaging faces which extend over the tread surface area of the tire and project over the sides of the tire to a place near the transverse middle line thereof, said half clamp members each also having an annular tread rim face and a side clencher flange, said body portions having transverse bolt holes, a solid tire tread member held against said rim faces and engaged by said side clencher flanges, clamp bolts passing through said bolt holes having provision for securing said half clamps together and applying retaining friction to clamp the same on the inflated tire and simultaneously compress the solid tire tread in the rim space formed by the opposing half clamp members, the rim surfaces of the respective half clamp members sloping from the side clencher flanges inwardly toward the center and the solid tread tire having its opposed face held in frictional engagement with said sloping surfaces by virtue of the compression strains applied through the clamping action of said half clamp members.

ARCADE G. BOIVIN.
FRED. J. DAVIGNON.